Sept. 29, 1953
D. H. DASHIELL
2,654,003
OSCILLATOR-AMPLIFIER CIRCUITS FOR MAGNETIC RECORDING AND REPRODUCING SYSTEMS
Filed Nov. 24, 1947
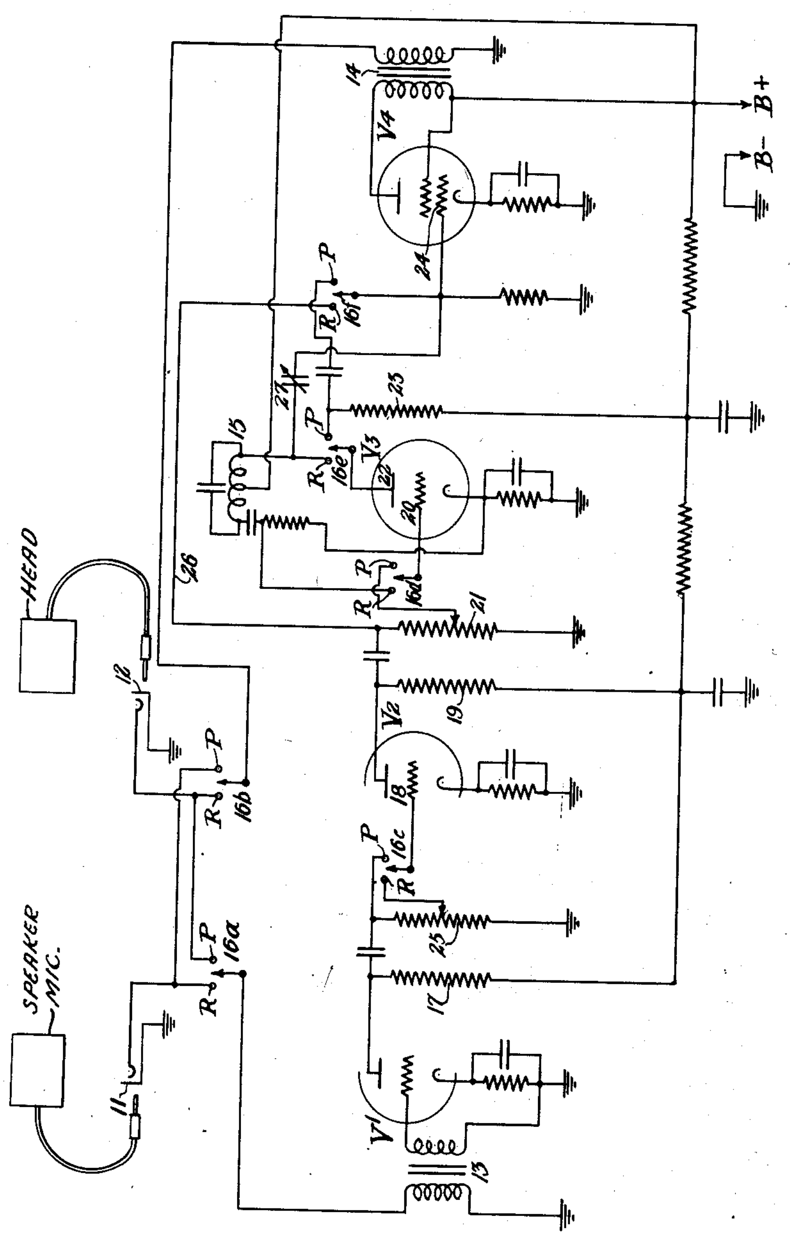
INVENTOR
Daniel H. Dashiell
BY
Synnestvedt & Lechner
ATTORNEYS Patented Sept. 29, 1953

2,654,003

UNITED STATES PATENT OFFICE 2,654,003

OSCILLATOR-AMPLIFIER CIRCUITS FOR MAGNETIC RECORDING AND REPRODUCING SYSTEMS

Daniel H. Dashiell, Philadelphia, Pa., assignor to The International Electronics Company, Philadelphia, Pa., a corporation of Pennsylvania Application November 24, 1947, Serial No. 787,640

3 Claims. (Cl. 179—100.2)

This invention relates to magnetic recording and reproducing systems, and, more particularly, has to do with systems in which the same equipment is used both in producing magnetic records and in reproducing them.

A well known characteristic of magnetic recording is the fact that the absolute voltage delivered by a magnetic head on reproduction is very low. On the other hand, the signal voltages generated by some sources of signals to be recorded are relatively high.

It is a general object of the invention to accommodate and to take advantage of the difference in signal voltages which must be amplified respectively in the recording and reproducing operation, in a manner to reduce the number of components in and simplify the arrangement of the electronic circuits of a magnetic recording and reproducing system.

How the foregoing and other objects are attained will be more fully understood upon reference to the description hereinbelow and the figure.

While the invention in its broadest aspects is generally applicable to magnetic recording systems, I have illustrated the invention as applied to an office dictation machine of the general type described in copending application Serial No. 717,754, filed December 21, 1946, and assigned to the assignee of the present application. In this type of apparatus, the same head is used both for recording and for reproducing, and a single transducer is used both as a microphone and as a loudspeaker. In addition, the same amplifier is used both for recording and for reproducing. It will be understood that the voltage amplification required for recording is much less than that required for reproduction, due to the much greater voltage output of the speaker-microphone when used as a microphone than that of the magnetic head when used as a reproducer.

The invention is particularly adaptable to magnetic recording systems of the type which involve the polarization of the record during recording by means of an alternating current of frequency substantially higher than the highest frequency to be recorded or reproduced, which voltage is applied to the head simultaneously with the signal voltage and which may advantageously but not necessarily be amplified in at least a portion of the signal amplifier. Accordingly, I have illustrated the invention as applied to a magnetic recording-reproducing system of the type employing a low level, high frequency oscillator whose output during recording is fed to a power amplifier stage simultaneously with the signal to be recorded. Such a system is fully disclosed and claimed in copending application of Lloyd J. Bobb, Serial No. 787,644, now Patent No. 2,641,655, filed concurrently herewith and entitled Magnetic Recording and Reproducing Circuits, which is assigned to the assignee of the present invention.

Turning now to the drawing and considering first the overall pattern of the circuit, attention is first directed to a jack 11 for a speaker-microphone, a second jack 12 for a magnetic recording-reproducing head, an input transformer 13, an output transformer 14, and electron discharge tubes V–1, V–2, V–3 and V–4. Also to be noted are the oscillator tank circuit generally indicated at 15, and the six sections of a double throw switch 16, of which sections 16*a* and 16*b* serve to connect speaker-microphone jack 11 and magnetic head jack 12 to input and output transformers 13 and 14 respectively and to invert these connections. Switch sections 16*c*, 16*d*, 16*e*, and 16*f* have functions specifically in connection with the several aspects of the present invention, as will appear more clearly hereinbelow.

When switch 16 is thrown to the "play back" position, as indicated by the letter "P" in the illustration of each of the switch sections, the four discharge tubes are connected in cascade to amplify a signal originating in the magnetic head and deliver the amplified signal to the speaker-microphone. When the switch is in this position, the voltage developed by V–1 across plate impedance 17 is delivered through fixed contact "P" of switch section 16*c* to the grid 18 of V–2. The voltage developed across plate impedance 19 by V–2 is then applied to grid 20 of V–3 through a volume control attenuator 21 and switch contact "P" of switch section 16*d*. Plate 22 of V–3 is connected to plate impedance 23 through switch contact "P" of section 16*e* and the voltage developed across impedance 23 is delivered through contact "P" of section 16*f* to grid 24 of V–4. The output of V–4 is then delivered to speaker-microphone jack 11 through output transformer 14 through contact "P" of switch section 16*b*.

It should be pointed out that in the reproducing operation just described, the amplification of the signal from the magnetic head is controlled by attenuator 21 only after having been successively amplified by discharge tubes V–1 and V–2. Thus, the control is introduced at a point where the absolute value of the signal is great enough to permit non-critical control, that is, the useful volume range may be spread out over a comparatively wide absolute voltage range.

In the mode of operation above described, the relatively small signal voltage originating in the magnetic head is subjected to three stages of voltage amplification and one stage of power amplification, and is thus raised to a level appropriate to reproduction.

When the apparatus is adjusted for recording, however, less amplification is required, due to the fact that the output voltage of the speaker-microphone is much greater than that of the magnetic head. Not only is the total amplification required much less than that required for reproduction, but also the signal voltage is large enough, after one stage of amplification in V-1, to fully load or even overload V-2. For this reason, it is desirable to control the amplification of the signal to be recorded earlier than was the case with the reproduced signal.

In addition, the recording operation not only requires that an amplified signal voltage be applied to the magnetic head, but also depends upon the simultaneous delivery to the head of a polarizing voltage. I have found that the difference in amplification required is at least equal to the voltage amplification derived from a conservatively operated voltage amplifier stage.

Accordingly, I employ as a polarizing current generator one of the discharge tubes which is used as a voltage amplifier during the reproduction of magnetically recorded signals. In this way, I eliminate the necessity for employing an additional tube as an oscillator, which would perforce be idle during reproduction, by employing for this purpose a discharge tube which is unnecessary to achieve the amplification required during recording, the invention discussed in this paragraph is disclosed and claimed in my copending application filed August 27, 1953, and entitled Magnetic Recording and Reproducing Circuit, which application is a continuation of the present application.

Again referring to the figure, it will be seen that when switch 16 is adjusted to the recording position, speaker-microphone jack 11 is connected to input transformer 13 through contact R of section 16*a*, and magnetic head jack 12 is connected to output transformer 14 through contact R of section 16*b*. The signal is amplified by V-1 as before, and the amplified voltage delivered to grid 18 of V-2 through volume control attenuator 25 and contact R of section 16*c*. Controlling the amplification of the signal to be recorded at this point provides the same advantages as does the control of the reproduced signal at attenuator 21 during reproduction, namely, the signal is controlled at a level appropriate to noncritical control.

The use of two volume controls in separate stages, one of which is operative in each of the two conditions of operation, is broadly disclosed and claimed in copending application of Lloyd J. Bobb, Serial No. 787,645, now Patent 2,600,046, entitled Improvements in Magnetic Recording and Reproducing Circuits, filed concurrently herewith and assigned to the assignee of the present invention.

The output voltage of V-2, developed across plate load resistor 19, is delivered to the grid of V-4 through a conductor 26 and contact R of switch section 16*f*. In addition, through the operation of switch sections 16*d* and 16*e*, the plate 22 of V-3 is connected to one end of the oscillator tank circuit generally indicated at 15, and the opposite end of the tank circuit is connected through contact R of switch section 16*d* to grid 20 of V-3. The plate end of the tank circuit 15 is continuously connected to grid 24 of V-4, and therefore, the oscillations generated by V-3 are applied to V-4 simultaneously with the amplified signal delivered through conductor 26 and contact R of switch section 16*f*.

It will appear from the figure that the oscillator tank circuit is effectively shunted across the input of discharge tube V-4. However, the variable coupling condenser 27 is of such small capacity (of the order of 25 mmf.) that the impedance of the tank circuit as a whole is so high at the audio frequencies as to have no effect on the reproduced signal.

Thus, the discharge tube V-3, which functions as a voltage amplifier during reproduction, is connected to operate as an oscillator during recording.

I claim:

1. In magnetic recording apparatus of the type which employs the same components for recording and reproducing, an amplifier-oscillator unit, comprising a first discharge tube and a second discharge tube, a first variable attenuator connectible to control the first tube and a second variable attenuator connectible to control the second tube, an oscillatory network adapted to be connected to the second tube, and switch means for alternatively establishing two conditions, in the first of which the first attenuator controls the signal voltage applied to said first tube, the second attenuator is inoperative, the oscillatory network is connected to the input and output of the second discharge tube and the outputs of said two tubes are combined, and in the second of which conditions said two tubes are in cascade amplifier connection, said first attenuator is inoperative, said second attenuator controls the voltage applied to the grid of said second tube, and said oscillatory network is inoperative.

2. Apparatus in accordance with claim 1 in which said switch means includes a switch for alternatively connecting said second tube to said second attenuator and to said oscillatory network.

3. Magnetic recording and reproducing apparatus comprising: a magnetic recording and reproducing head; an amplifier having a plurality of amplifying stages each including an electron discharge tube having at least a grid and a plate; an oscillatory network; first and second attenuators respectively connectible with the inputs of second and third stages; and switch means having a record position and a reproduce position including a plurality of contacts operable in said positions, in said reproduce position the switch connecting: the head to the input of said amplifier, the amplifying stages in cascade, and the second attenuator between the output of the second stage and the input of the third stage, and in said record position said switch providing for the disconnection of the connections made in the reproduce position and further providing for connecting: the head to the output of said amplifier, the first, second and last stages in cascade, the first of said attenuators between the first and second stages, the oscillatory network between the plate and the grid of the tube of a disconnected stage, and the plate of said disconnected tube to the input of the last stage.

DANIEL H. DASHIELL.

References Cited in the file of this patent

UNITED STATES PATENTS

| Number | Name | Date |
|---|---|---|
| 2,121,434 | Klinedinst et al. | June 21, 1938 |
| 2,351,005 | Camras | June 13, 1944 |
| 2,414,795 | Brandt | Jan. 28, 1947 |
| 2,439,844 | Davis | Apr. 20, 1948 |
| 2,535,486 | Dank | Dec. 26, 1950 |
| 2,540,299 | Shoup | Feb. 6, 1951 |